United States Patent
Dale et al.

(10) Patent No.: US 9,465,744 B2
(45) Date of Patent: Oct. 11, 2016

(54) DATA PREFETCH RAMP IMPLEMENATION BASED ON MEMORY UTILIZATION

(71) Applicant: INTERNATIONAL BUSINESS MACHINES CORPORATION, Armonk, NY (US)

(72) Inventors: Jason Nathaniel Dale, Austin, TX (US); Miles R. Dooley, Austin, TX (US); Richard J Eickemeyer, Jr., Rochester, MN (US); John Barry Griswell, Jr., Austin, TX (US); Francis Patrick O'Connell, Austin, TX (US); Jeffrey A. Stuecheli, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 140 days.

(21) Appl. No.: 14/445,214

(22) Filed: Jul. 29, 2014

(65) Prior Publication Data
US 2016/0034400 A1 Feb. 4, 2016

(51) Int. Cl.
*G06F 12/08* (2016.01)

(52) U.S. Cl.
CPC ....... *G06F 12/0862* (2013.01); *G06F 12/0897* (2013.01); *G06F 2212/1024* (2013.01); *G06F 2212/602* (2013.01)

(58) Field of Classification Search
None
See application file for complete search history.

(56) References Cited

U.S. PATENT DOCUMENTS

| | | | | |
|---|---|---|---|---|
| 6,233,645 | B1* | 5/2001 | Chrysos | G06F 9/3802 710/116 |
| 6,976,147 | B1* | 12/2005 | Isaac | G06F 12/0862 711/137 |
| 7,533,242 | B1 | 5/2009 | Moll et al. | |
| 7,689,775 | B2 | 3/2010 | Griswell, Jr. et al. | |
| 7,716,427 | B2 | 5/2010 | Griswell, Jr. et al. | |
| 7,904,661 | B2 | 3/2011 | Fluhr et al. | |
| 2004/0123043 | A1* | 6/2004 | Rotithor | G06F 12/0215 711/137 |
| 2004/0148470 | A1* | 7/2004 | Schulz | G06F 12/0862 711/137 |
| 2004/0221111 | A1* | 11/2004 | Phelps | G06F 12/0862 711/137 |
| 2007/0283101 | A1* | 12/2007 | El-Essawy | G06F 12/0862 711/137 |
| 2008/0250208 | A1* | 10/2008 | O'Connell | G06F 9/383 711/137 |

(Continued)

OTHER PUBLICATIONS

Muralidhara et al. "Bandwidth Constrained Coordinated HW/SW Prefetching for Multicores." Aug. 2011. Springer-Verlag. Euro-Par 2011. LNCS 6852. pp. 310-325.*

(Continued)

*Primary Examiner* — Nathan Sadler
(74) *Attorney, Agent, or Firm* — Michael R. Long; Steven L. Bennett (57) ABSTRACT

A technique for data prefetching for a multi-core chip includes determining memory utilization of the multi-core chip. In response to the memory utilization of the multi-core chip exceeding a first level, data prefetching for the multi-core chip is modified from a first data prefetching arrangement to a second data prefetching arrangement to minimize unused prefetched cache lines. In response to the memory utilization of the multi-core chip not exceeding the first level, the first data prefetching arrangement is maintained. The first and second data prefetching arrangements are different.

9 Claims, 5 Drawing Sheets

(56) References Cited

U.S. PATENT DOCUMENTS

| | | | |
|---|---|---|---|
| 2010/0241811 A1* | 9/2010 | Solihin | G06F 12/0862 711/137 |
| 2011/0113199 A1* | 5/2011 | Tang | G06F 12/0862 711/130 |
| 2012/0144124 A1* | 6/2012 | Lepak | G06F 12/0862 711/137 |
| 2013/0124563 A1 | 5/2013 | Cavelie et al. | |
| 2013/0246708 A1* | 9/2013 | Ono | G06F 12/0862 711/122 |
| 2014/0108740 A1* | 4/2014 | Rafacz | G06F 12/0862 711/137 |
| 2014/0237212 A1* | 8/2014 | Garg | G06F 12/0215 711/205 |
| 2014/0342716 A1* | 11/2014 | Harris | H04W 8/22 455/418 |
| 2016/0019155 A1* | 1/2016 | Radhakrishnan | G06F 12/0862 711/137 |

OTHER PUBLICATIONS

Knot et al., "Adaptive Filetype Aware Prefetching", Department of Computer Sciences University of Wisconsin, Madison, WI (http://pages.cs.wisc.edu/~tushar/projects/cs736.pdf) downloaded Jul. 29, 2014.

Srinath et al., Srinath, Santhosh, et al. "Feedback directed prefetching: Improving the performance and bandwidth-efficiency of hardware prefetchers." High Performance Computer Architecture, 2007. HPCA 2007. IEEE 13th International Symposium on. IEEE, Feb. 14, 2007.

* cited by examiner

DATA PREFETCH RAMP IMPLEMENATION BASED ON MEMORY UTILIZATION

BACKGROUND

The disclosure generally relates to data prefetching, and more particularly, to data prefetch ramp implementation based on memory utilization.

Data prefetch (cache management) instructions, which have conventionally used direct addressing, have been employed to move data into a cache before the data is accessed in an attempt to minimize cache-miss latency. Data prefetch instructions (which may be added to software by a compiler or programmer) are generally treated as hints, which affect software performance but not software functionality. Prefetched data in a same cache line as desired data has spatial locality and has a high probability of being accessed in the near future. Data with temporal locality, or persistence, is expected to be accessed multiple times and should generally be maintained in a cache for ready accessibility. Accesses to data with no temporal locality is transient, and, as such, data with no temporal locality should generally be removed from a cache after use to provide room in the cache for other data.

Some data prefetch instructions allow a cache level in which prefetched data should be stored to be specified. Various data prefetch instructions make a distinction between memory which is expected to be read and memory which is expected to be written. When data is to be written, a data prefetch instruction usually moves a data block into a cache in an exclusive or modified state so that an expected store can be made directly in the cache, as contrasted with main memory. A prefetch for data to be written can usually be replaced with a prefetch for data to be read (this is usually how implementations that define both kinds of instructions, but do not support prefetch for writes, operate). A data block accessed by a data prefetch instruction usually corresponds to a cache line, whose size is implementation-specific.

Various architectures implement data prefetch instructions in various ways. For example, some architectures implement data prefetch instructions with a base update form, which modifies a prefetch address following a prefetch. Base update (pre/post increment/decrement) is also supported on load and store instructions for some architectures and can be taken into consideration in code that uses data prefetch instructions. Some architectures recognize data prefetch instructions but treat them as no operation (nop) instructions. However, a base address of a data prefetch instruction that has a base update form may be updated even if addressed memory cannot be prefetched. Some architectures implement data prefetch instructions that cause faults when the address to prefetch is invalid or not cacheable. However, data prefetch instructions are usually ignored for memory pages that are not cacheable. In general, data should be available in a cache prior to being accessed. However, using prefetches that are too speculative can produce negative results as there are costs associated with data prefetch instructions. Similarly, prefetching data that is already in the cache increases overhead without providing any benefit. For example, data may already be in a cache when the data is in the same cache line as data already prefetched (spatial locality) or if the data has been accessed recently (temporal locality).

BRIEF SUMMARY

A technique for data prefetching for a multi-core chip includes determining memory utilization of the multi-core chip. In response to the memory utilization of the multi-core chip exceeding a first level, data prefetching for the multi-core chip is modified from a first data prefetching arrangement to a second data prefetching arrangement to minimize unused prefetched cache lines. In response to the memory utilization of the multi-core chip not exceeding the first level, the first data prefetching arrangement is maintained. The first and second data prefetching arrangements are different.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a processor configured to implement a data prefetch ramp based on memory utilization.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/ devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements.

In multicore integrated circuit (chip) designs, available memory bandwidth may be shared by all processor cores on a chip. In this case, memory bandwidth may become a limiting factor for performance when data intensive applications are running on some or all of the processor cores of the chip. To maximize total chip performance, all requests to memory from the processor cores should generally be useful. Achieving optimal thread-level performance often requires employing aggressive hardware data prefetching. However, aggressive data prefetching often increases the number of cache lines that are prefetched but not ultimately used by an application program, which results in wasted memory bandwidth.

According to the present disclosure, techniques are disclosed that generally balance the performance of individual threads against the performance of a multi-core chip as a whole. According to one or more embodiments, when available memory bandwidth utilization (memory utilization) is above a determined level, prefetching by each thread (or processor core) may be modified to minimize unused prefetches. For example, assuming that memory controller command queues are not over-designed, memory utilization may be accurately determined by examining a fullness of the memory controller command queues. As another example, memory utilization may be determined by a level of memory access command retries over a predetermined time period. As is known, when a memory access command (e.g., a read or a write) cannot be serviced by a memory controller, the memory controller usually retries the memory access command. For example, the predetermined time period in which retries are monitored may correspond to tens or hundreds of processor cycles. As one example, a retry every forty processor cycles or less may indicate high memory utilization. As yet another example, memory utilization may be determined by bus utilization. For example, free cycles versus used cycles on a bus that interfaces a processor core to memory may be examined to determine memory utilization.

According to the present disclosure, techniques are disclosed for adapting the aggressiveness of a hardware data prefetching ramp to utilization of system memory bandwidth so that there is less wasted bandwidth due to data prefetches that are sent but not consumed by a thread, when memory utilization is above a predetermined level. According to one or more embodiments, a ramp phase can be dynamically adjusted to facilitate an appropriate response to high memory bandwidth conditions. In general, dynamically adjusting a ramp phase increases the accuracy of data prefetching, while retaining the advantage of data prefetching (albeit in a less aggressive manner), and generally improves overall multi-core chip performance. In various embodiments, data prefetching accuracy feedback may be also be implemented to improve the effectiveness of the disclosed techniques. For example, a prefetch bit may be associated with a cache line that indicates that the cache line was prefetched. In this case, when a cache line is prefetched, the prefetch bit is asserted. Assuming a processor requests the prefetched cache line, the prefetch bit associated with the cache line is de-asserted. In this case, when a cache line is invalidated or cast-out from a cache, an associated prefetch bit for the cache line is examined to determine whether the cache line was prefetched and not used. As a processor core is aware of the number of prefetches sent over a given time period, a processor core can readily contrast the number of non-utilized prefetches with utilized prefetches during the given time period.

A 'ramp-up phase' for a data stream prefetcher is the phase defined from the cycle that the prefetcher detects a candidate stream to the cycle in which the prefetcher has sent a predetermined number of cache line prefetches ahead of a cache line being currently accessed by a thread (i.e., when the prefetcher has sent the predetermined number of cache lines ahead of the cache line currently being accessed a stream is fully ramped). In general, all prefetches are speculative, i.e., some or all prefetched cache lines may not ultimately be used before they are evicted from a cache. By delaying the ramp-up phase until one or more cache lines in a candidate stream are confirmed, the degree of speculation can be reduced in a probabilistic sense. According to the present disclosure, memory utilization feedback is employed to modify the degree of speculation of the prefetches that a processor core sends by delaying the ramp for candidate streams. For example, when heavy memory utilization is indicated, prefetch hardware delays a ramp by one or more cache line confirmations. It should be appreciated that delaying a ramp for prefetch hardware decreases a degree of speculation of a prefetched set of cache lines.

As one example, a default response of a prefetcher may be to send a prefetch for a next adjacent cache line each time the prefetcher detects a cache line miss that is not part of an existing stream. If the next adjacent cache line is subsequently referenced by a processor core (referred to herein as a 'stream confirmation'), the prefetcher may send prefetches for a next two cache lines. If a third cache line is referenced (providing a second confirmation on the stream), the prefetcher may send prefetches for the next four cache lines past the previous two cache lines for which the prefetcher sent prefetches. Finally, if the fourth cache line in the stream is referenced (providing a third confirmation), the prefetcher may send one prefetch for what is a ninth cache line in the stream (which is five cache lines ahead of the cache line just referenced). Subsequently, the prefetcher may send one additional prefetch for every additional stream confirmation.

According to one embodiment of the present disclosure, a prefetcher responds to a signal indicating heavy memory utilization (i.e., memory utilization above a predetermined level) by delaying an initial prefetch for multiple cache lines, e.g., two cache lines. As one example, when an original miss is detected, no prefetches are sent for a candidate stream. In this example, no prefetches are sent for a first confirmation for the candidate stream. In response to a third cache line in the candidate stream being referenced, the prefetcher sends a prefetch for the next (fourth) cache line. If there is another confirmation to the candidate stream, the prefetcher sends prefetches for the next two cache lines continuing the ramp described above, but delayed by two cache lines. According to the adaptive ramp technique described above, assuming a stream is a degenerate single-line stream or a two-line stream no speculative prefetches are sent by the prefetcher.

If a stream is three cache lines long a prefetcher that employs a conventional ramp sends five prefetches past the end of the stream. In contrast, a prefetcher that employs an adaptive ramp as described above sends just two prefetches beyond the end of the stream. While it is possible that an application will eventually reference cache lines that have been prefetched at some later point in a program, from a probabilistic standpoint a prefetcher that implements an adaptive ramp is less speculative. As such, other threads on a processor core (and other processor cores) may use memory bandwidth that would have been speculatively consumed. It should be appreciated that the disclosed techniques are equally applicable to different ramps.

In the event that memory utilization is low (i.e., below a predetermined level), a more aggressive ramp may substantially improve performance of an application even if many of the prefetched lines are not consumed, since any successful prefetch from memory avoids the long penalty of a cache miss while having little or no negative effect on other threads in a data processing system. Using prefetching to avoid the cache miss penalty illustrates the fundamental trade-off of single thread/processor core performance versus total chip level performance. According to another embodiment, the disclosed techniques may be further enhanced by using a prefetching accuracy history.

For example, prefetching accuracy can be tracked by tag bits in a cache indicating whether a line has been prefetched into the cache and also whether that line has been subsequently loaded by or stored to by a thread. With the additional input of recent prefetching accuracy, the adaptivity of the prefetch ramp may be modified more effectively. In the event that memory utilization above a predetermined level is indicated and recent prefetching accuracy information indicates poor prefetch accuracy, a prefetch ramp may be delayed. In the event recent prefetching history indicates excellent prefetching accuracy, a prefetch ramp may not be delayed. In the former case, wasted memory bandwidth is reduced (perhaps at decreased thread performance) and overall chip performance increases. In the later case, performance of a thread is not needlessly reduced to benefit other threads (which, if desired, could be the role of a fairness protocol that is layered on top of the disclosed techniques).

Figure 1:
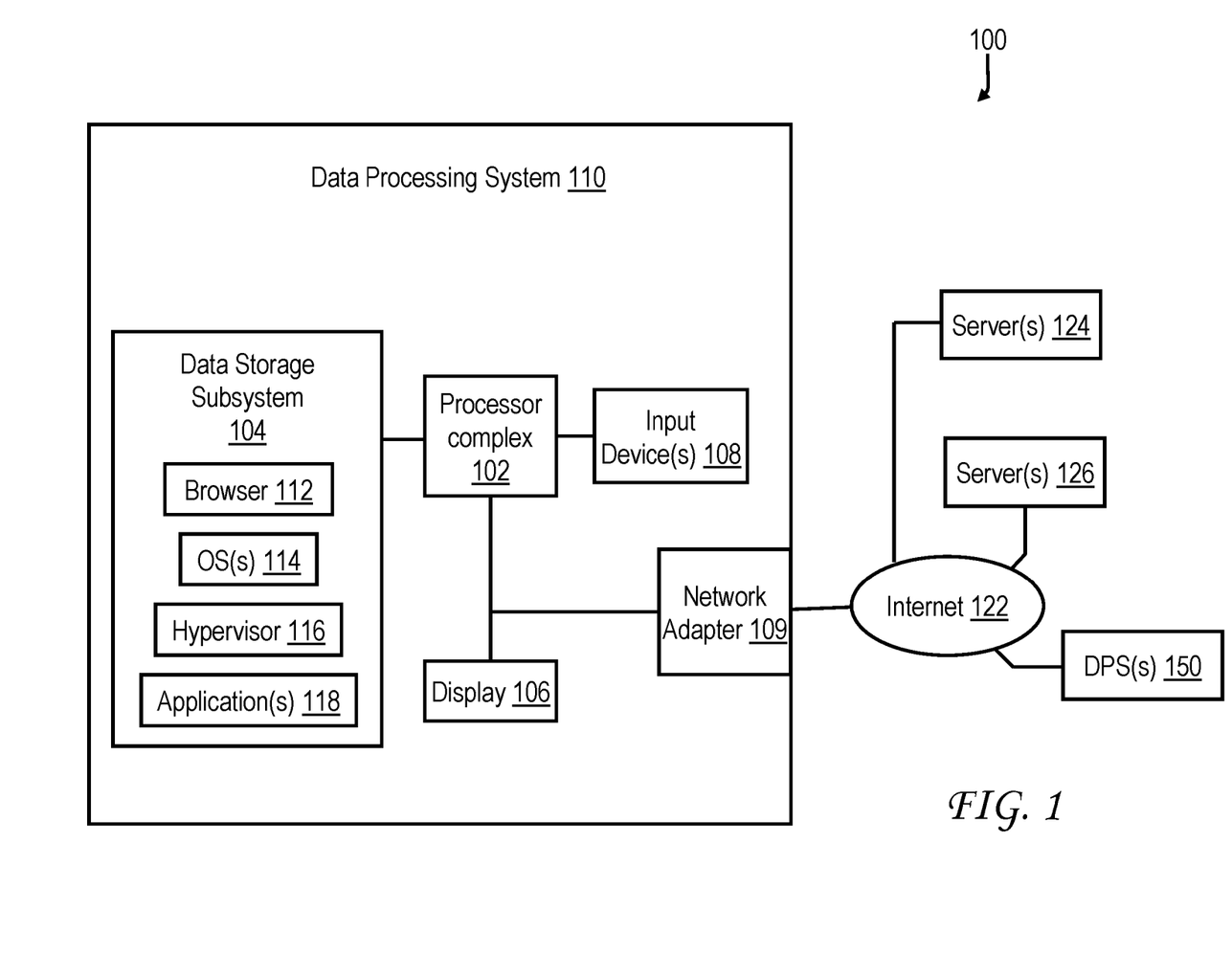
FIG. 1 is a diagram of a relevant portion of an exemplary data processing system environment that includes a data processing system that is configured to implement a data prefetch ramp based on memory utilization according to the present disclosure.

With reference to FIG. 1, an exemplary data processing environment 100 is illustrated that includes a simultaneous multithreading (SMT) data processing system 110 that is configured, according to one or more embodiments of the present disclosure, to implement a data prefetch ramp based on memory utilization. Data processing system 110 may take various forms, such as workstations, laptop computer systems, notebook computer systems, desktop computer systems or servers and/or clusters thereof. Data processing system 110 includes a processor complex 102 (which may include one or more chip multi-processors (CMPs) that each include multiple processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives or solid-state drives (SSDs).

Data storage subsystem 104 includes one or more operating systems (OSs) 114 for data processing system 110. Data storage subsystem 104 also includes application programs, such as a browser 112 (which may optionally include customized plug-ins to support various client applications), a hypervisor (or virtual machine monitor (VMM)) 116 for managing one or more virtual machines (VMs) as instantiated by different OS images, and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Traditionally, data prefetch instructions have employed direct addressing. Unfortunately, for many high performance computing (HPC) applications (e.g., computational fluid dynamics and building and testing virtual prototypes), employing direct addressing for data prefetch instructions may not provide a desired performance level. For example, as programmers gravitate to employing higher-level languages (e.g., Java and X10) data addressing is increasingly utilizing object-oriented mechanisms that frequently implement indirect addressing. In this case, prefetch engines of conventional processors may stall when referenced data is based on prefetched data (i.e., when indirect addressing is employed).

Instruction set architecture (ISA) support for data prefetching using indirect addressing may be implemented by employing a data prefetch instruction (e.g., a load instruction) whose return data is a pointer to data of interest. In general, programs are written using effective addresses (EAs), while caches and main memory are accessed utilizing real addresses (RAs). As such, address translation is required to convert the EAs (used by software) to RAs (used by hardware). For example, in various PowerPC™ architectures a segment table (e.g., located in a segment lookaside buffer (SLB)) and hashed page table (e.g., located in a translation lookaside buffer (TLB)) have been employed to translate EAs (used by software) into RAs (used by hardware) to locate data in storage. After translation, an EA and RA pair may be stored in an effective-to-real address translation (ERAT) buffer to reduce latency associated with accessing data in storage. In general, an ERAT table (stored in the ERAT buffer) may be accessed (indexed) using an EA associated with a data prefetch instruction. It should be appreciated that the techniques disclosed herein are equally applicable to architectures that convert an EA to an RA without first converting the EA to a virtual address (VA).

Figure 2:
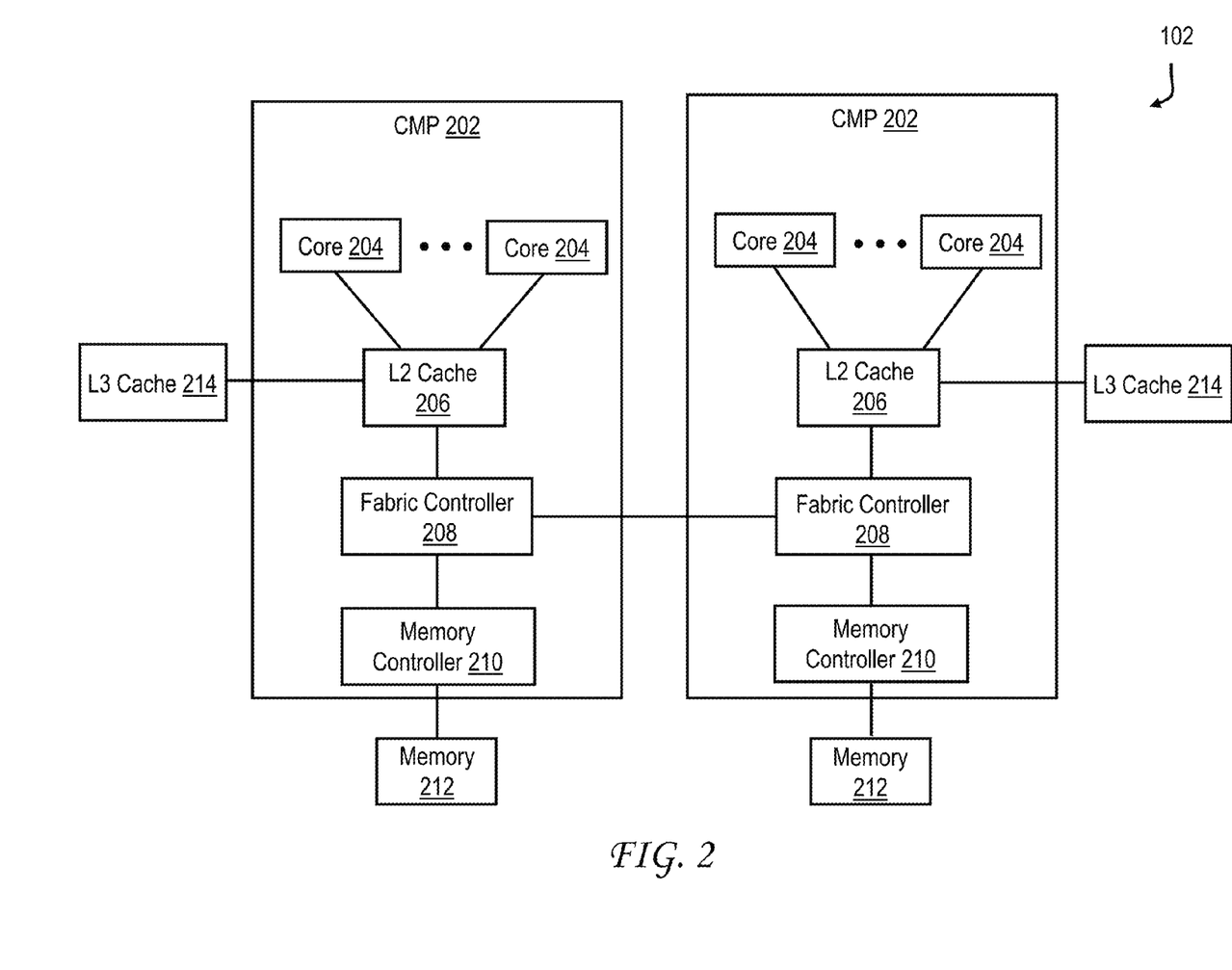
FIG. 2 is a diagram of a relevant portion of an exemplary processor of FIG. 1 that includes two chip multi-processors (CMPs)

With reference to FIG. 2, an exemplary processor complex 102 is illustrated that may implement data prefetching according to one or more of the techniques disclosed herein. As is illustrated, processor complex 102 includes two chip multiprocessors (CMPs) 202, each of which includes multiple processor cores 204. For example, each CMP 202 may include eight processor cores. Processor cores 204 may, for example, operate in an SMT mode or a single thread (ST) mode. When processor cores 204 are operating in the SMT mode, processor cores 204 may employ multiple separate instruction fetch address registers to store program counters for multiple threads. In at least one embodiment, processor cores 204 each include a first level (L1) cache memory (not separately shown) that is coupled to a shared second level (L2) cache memory (cache) 206, which is coupled to a shared third level (L3) cache 214 and a fabric controller 208. As is illustrated, fabric controller 208 is coupled to a memory controller 210, which is coupled to a memory subsystem 212. Memory subsystem 212 includes an application appropriate amount of volatile and non-volatile memory and may, for example, be implemented within data storage subsystem 104. Fabric controller 208 facilitates communication between different ones of CMPs 202 and between processor cores 204 and memory subsystem 212 and in this manner functions as an interface.

A load-store unit (LSU) of processor core 204 may be configured to, for example, first fetch a pointer (e.g., a four-byte or an eight-byte pointer) from an RA associated with an EA specified in an indirect data prefetch instruction (e.g., an indirect load instruction or an indirect store instruction). In one or more embodiments, after fetching the pointer, the LSU treats the pointer (return data) as an EA. The EA is then translated by the LSU to determine an RA (associated with a cache line and/or block of main memory) from which to fetch desired data.

As is described herein, for data prefetching using indirect addressing, address translation is performed at least twice. For example, an address translation engine may first determine a first RA from a first EA. Once returned data associated with the first RA is received at the LSU, the LSU may then translate the returned data (a new EA) to a new RA. To improve efficiency and provide higher translation bandwidth, an LSU may be configured to include two or more address translation engines. In this case, a second address translation engine may be coupled to an additional port of a segment lookaside buffer (SLB) and an additional port of a translation lookaside buffer (TLB). The second address translation engine may also be coupled to an additional port of a data effective-to-real address translation (D-ERAT) buffer, which summarizes tables in the SLB and the TLB buffers. The additional ports allow a new EA to be translated by the second address translation engine, while a first address translation engine is available to translate other indirect data prefetching instructions (e.g., load/store instructions).

Figure 3:
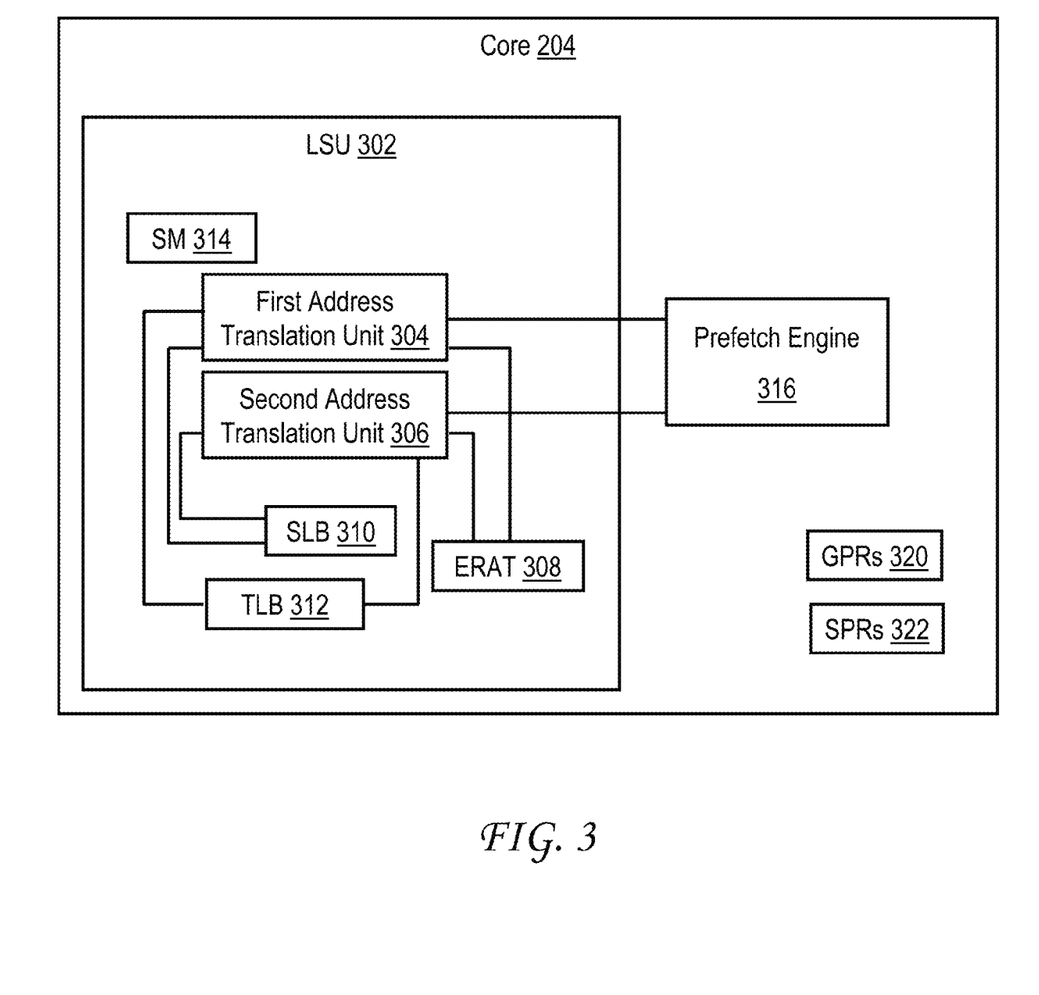
FIG. 3 is a diagram of a relevant portion of an exemplary processor core that includes a prefetch engine, configured according to one aspect of the present disclosure, and an exemplary load-store unit (LSU)

With reference to FIG. 3, a relevant portion of processor core 204 is shown as including a load-store unit (LSU) 302 that includes a first address translation unit 304 and a second translation unit 306, each of which are coupled to a prefetch engine 316. A state machine (SM) 314 may be included to walk through elements in a data block to compute B[I]+O (where B[I] is an element in the data block, e.g., a cache line) for each element in the data block to determine EAs when an offset 'O' is employed. First address translation unit 304 is coupled to a first port of SLB 310, a first port of TLB 312, and a first port of ERAT 308. Similarly, second address translation unit 306 is coupled to a second port of SLB 310, a second port of TLB 312, and a second port of ERAT 308. In this configuration, first and second address translation units 304 and 306 can simultaneously access SLB 310 and TLB 312 or ERAT 308 and, in this manner, perform two address translations simultaneously.

Prefetch engine 316 may also be configured to support indirect addressing with register offset. For example, prefetch engine 316 may be configured to calculate a target address utilizing an offset included in a general purpose register (GPR) 320 or other processor register. In this case, desired data to be fetched through indirect data prefetching is not at a pointer location (PL), but is at an offset from the PL. The offset can be specified in various manners in a programming environment. For example, the offset can be specified through a special purpose register (SPR) 322 in a processor core, caches, or memory. As other examples, the offset can be specified as a new address field in the prefetch instruction or as a new register field in a prefetch instruction.

In various embodiments, prefetch engine 316 is configured to include logic to detect indirect data prefetch streams (based upon access history) and prefetch targets of subsequent accesses in a memory access stream. In this case, a programmer is not required to employ hints to specify indirect prefetching addresses and offsets. As such, configuring a processor to detect indirect prefetching streams, while increasing hardware complexity, generally simplifies programming. Moreover, when a programmer attempts to specify indirect data prefetch streams and misses one or more of the streams, a prefetch engine configured to detect a stream of indirect address accesses to memory detects the missed indirect data prefetching streams. As employing data prefetch instructions in a program only enhances performance, a program runs, with or without performance hints provided by a programmer (however, if the programmer does not provide indirect prefetch hints or provides wrong information the program may run slower). A hardware prefetch mechanism that supports indirect addressing may be maintained in one or more prefetch tables in a prefetch engine in a processor core.

For indirect prefetching, such as A[B[I]] or A[B[I]+O] (where 'O' is a fixed offset), a prefetch engine attempts to capture successive values of B[I] for all references coming from an array A[ ] and attempts to anticipate a value of B[I] for a next value of 'I' (how much the index 'I' is incremented from one iteration to the next depends on the program). A first address of the array A[ ] may be hashed with an address of B[I] to generate an index into the prefetch table. The hashing may employ bit-wise exclusive OR (XOR) or another hashing scheme. In this case, for the same array A and B, for every new I there is a new B[I] and a new entry in a prefetch table of the prefetch engine.

For every new load reference to location A[B[I]], the prefetch table may be accessed, based on the indexing mechanism mentioned above. In a typical implementation, before actual execution of a data prefetch (e.g., a load) operation, the prefetch table is walked through to find successive addresses of A[B[I]]. At the time of execution of the data prefetch instruction (e.g., a load instruction), if the EA in the indexed entry is found to be different from what was calculated at the time of prediction for the data prefetch address, the prefetch table entry is updated (this typically happens when the address is seen for the first time and the prefetch table is not yet initialized). The prefetch table can also be maintained in a cache controller or main memory controller. In the case where the prefetch table is maintained in a cache or main memory controller, the prefetch table loses its effectiveness to some extent, as a prefetch stream is terminated at a page boundary.

Figure 4:
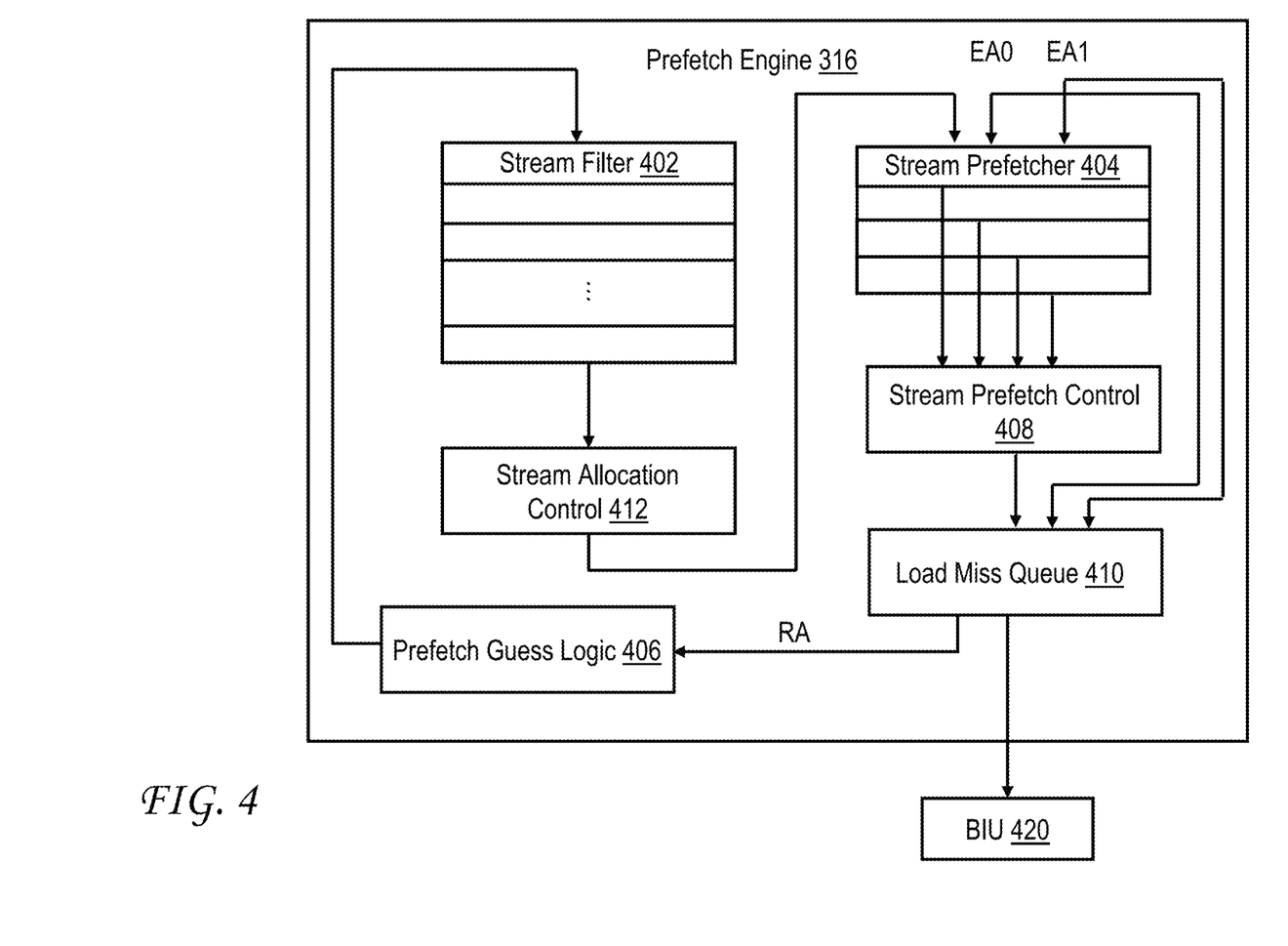
FIG. 4 is a diagram of a relevant portion of the prefetch engine of FIG. 3.

With reference to FIG. 4, one embodiment of prefetch engine 316 is further illustrated. In general, prefetch engine 316 prefetches data by monitoring data cache line misses and predicting patterns. When a stream pattern is detected, prefetch engine 316 speculatively prefetches cache lines in anticipation of their use. In one or more embodiments, prefetch engine 316 includes a stream filter (e.g., a ten-entry first-in first-out (FIFO) buffer) 402 and a data stream prefetcher (including a prefetch table) 404. Prefetch guess logic 406 observes data cache line misses (provided by load miss queue 410), in the form of RAs, to detect potential streams to prefetch. Stream filter 402, for example, may record data cache line miss information provided by prefetch guess logic 406. In general, prefetch guess logic 406 increments or decrements an RA of a cache line (e.g., depending on an offset within a cache line) and the 'guess' is placed in stream filter 402 (guesses in stream filter 402 may be communicated to stream prefetcher 404 by stream allocation control 412).

As new cache misses occur, if the RA of a new cache miss matches one of the guessed addresses in stream filter 402, a stream has been detected. If a stream prefetch control 408 has fewer than a predetermined number of streams (e.g., four streams) active, a new stream may be installed in stream filter 402, and a prefetch to a cache line anticipated next in the stream may be sent out to memory via a bus interface unit (BIU) 420. Once placed in prefetcher 404, a stream usually remains active until it is aged out. For example, a stream may be aged out when the stream reaches its end and other cache misses displace the stream entry in filter 402. When a stream is prefetched, prefetcher 404 attempts to stay ahead of a current cache line (i.e., the cache line whose elements are currently being accessed by a data prefetch instruction). For example, a next cache line that follows the current cache line may be prefetched into an L1 cache, and a cache line that follows the next cache line may be prefetched to a prefetch buffer (not separately shown) in BIU 420.

Prefetch engine 316 may be configured to concurrently prefetch multiple streams, each of which may be one or more cache lines ahead of a current cache line. In various embodiments, prefetch engine 316 monitors data prefetch (e.g., load) addresses (e.g., EA0 and EA1) from LSU 302. According to one embodiment, when LSU 302 finishes with a current cache line and advances to a next cache line (which is already in the L1 cache due to prefetching), prefetch engine 316 transfers the cache line in the prefetch buffer (in BIU 420) to the L1 cache and prefetches the next cache line into the prefetch buffer (in BIU 420). In this way, prefetching of lines may be paced by a rate at which elements in a stream are consumed.

According to various embodiments, data stream prefetcher 404 is configured to employ memory utilization feedback to modify a degree of speculation of prefetches that a processor core sends by delaying a ramp for a candidate stream when heavy memory utilization (i.e., memory utilization above a predetermined level) is indicated. That is, when memory utilization above the predetermined level is indicated, prefetcher 404 delays the ramp by one or more cache line confirmations. As noted above, delaying a ramp decreases a degree of speculation of a prefetched set of cache lines. As one example, a default response of prefetcher 404 may be to send a prefetch for a next adjacent cache line each time prefetcher 404 detects a cache line miss that is not part of an existing stream. If the next adjacent cache line is subsequently referenced by a processor core (referred to herein as a 'stream confirmation'), prefetcher 404 may send prefetches for a next two cache lines. If a third cache line is referenced (providing a second confirmation on the stream), prefetcher 404 may send prefetches for the next four cache lines past the previous two cache lines for which prefetcher 404 sent prefetches. Finally, if the fourth cache line in the stream is referenced (providing a third confirmation), prefetcher 404 may send one prefetch for what is a ninth cache line in the stream (which is five cache lines ahead of the cache line just referenced). Subsequently, prefetcher 404 may send one additional prefetch for every additional stream confirmation.

According to one embodiment of the present disclosure, prefetcher 404 responds to memory utilization above a predetermined level by delaying an initial prefetch for multiple cache lines, e.g., four cache lines. As one example, when an original miss is detected, no prefetches are sent for a candidate stream. In this example, no prefetches are sent for a first confirmation for the candidate stream. In response to a third cache line in the candidate stream being referenced, prefetcher 404 sends a prefetch for the next (fourth) cache line. If there is another confirmation to the candidate stream, prefetcher 404 sends prefetches for the next two cache lines continuing the ramp described above, but delayed by two cache lines. According to the adaptive ramp technique described above, assuming a stream is a degenerate single-line stream or a two-line stream no speculative prefetches are sent by prefetcher 404.

If a stream is three cache lines long a prefetcher that employs a conventional ramp sends five prefetches past the end of the stream. In contrast, prefetcher 404 sends just two prefetches beyond the end of the stream. While it is possible that an application will eventually reference cache lines that have been prefetched at some later point in a program, from a probabilistic standpoint a prefetcher that implements an adaptive ramp is less speculative. As such, other threads on a processor core (and other processor cores) may use memory bandwidth that would have been speculatively consumed. It should be appreciated that the disclosed techniques are equally applicable to different ramps.

In the event that memory utilization is low (i.e., below a predetermined level), prefetcher 404 may employ a more aggressive ramp to substantially improve performance of an application even if many of the prefetched lines are not consumed, since any successful prefetch from memory avoids the long penalty of a cache miss while having little or no negative effect on other threads in a data processing system. The disclosed techniques may be further enhanced by using a prefetching accuracy history. For example, prefetching accuracy can be tracked by tag bits in a cache indicating whether a line has been prefetched into the cache and also whether that line has been subsequently loaded by or stored to by a thread. With the additional input of recent prefetching accuracy, the adaptivity of the prefetch ramp may be modified more effectively. In the event that memory utilization above a predetermined level is indicated and recent prefetching accuracy information indicates poor prefetch accuracy, a prefetch ramp may be delayed. In the event recent prefetching history indicates excellent prefetching accuracy, a prefetch ramp may not be delayed.

Figure 5:
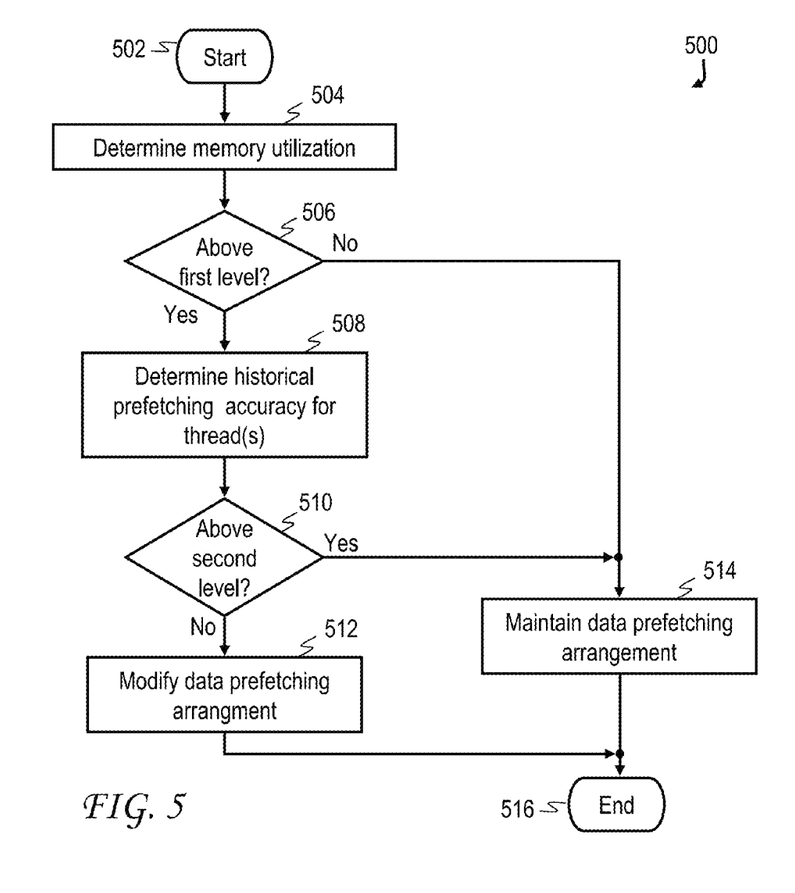
FIG. 5 is a flowchart of an exemplary process for implementing a data prefetch ramp based on memory utilization according to one embodiment of the present disclosure.

With reference to FIG. 5, an exemplary process 500 for implementing a data prefetch ramp based on memory utilization for a processor and historical prefetching accuracy for one or more threads executing on the processor is illustrated. In general, data prefetching by each thread (or processor core) may be modified to minimize unused prefetches based on memory utilization. Process 500 is initiated in block 502 in response to, for example, a cache miss by processor complex 102. Next, in block 504 processor complex 102 determines a current memory utilization. For example, the current memory utilization may be determined by examining a fullness of the command queues of memory controllers 210. As another example, memory utilization may be determined by a level of memory access command retries over a predetermined time period. As one example, a retry every fifty processor cycles or less may indicate memory utilization above a desired level. As yet another example, memory utilization may be determined by bus utilization. For example, free cycles versus used cycles on a bus that interfaces a processor to main memory may be examined to determine whether memory utilization is above a desired level.

Then, in decision block 506, processor complex 102 determines whether memory utilization is above a first level. In response to memory utilization not being above the first level in block 506 control transfers to block 514, where processor complex 102 maintains a first data prefetching arrangement, e.g., a default data prefetching arrangement. Following block 514 control transfers to block 516 where process 500 terminates until, for example, a next cache miss. In response to a determination in block 506 that memory utilization is above the first level, control transfers to block 508. In block 508 processor complex 102 determines historical prefetching accuracy of one or more active threads executing on processor complex 102. It should be appreciated that blocks 508-514 may be performed in parallel for each active thread. Next, in decision block 510 processor complex 102 determines whether historical prefetching accuracy is above a second level for each of the active threads. In response to a determination in block 510 that the historical prefetching accuracy for an active thread is above the second level, control transfers to block 514. In response to the historical prefetching accuracy for an active thread not being above the second level in block 510, control transfers to block 512. In block 512, the first data prefetching arrangement is modified to a second data prefetching arrangement for each of the active threads. In general, a ramp of the second data prefetching arrangement is delayed as compared to the first data prefetching arrangement. Following block 512 control transfers to block 516.

Accordingly, techniques have been disclosed herein that advantageously implement a data prefetch ramp based on memory utilization. An implemented data prefetch ramp may also be based on memory utilization for a processor and historical prefetching accuracy for one or more threads that are executing on the processor.

In the flow charts above, the methods depicted in FIG. 5 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of data prefetching for a multi-core chip, comprising:
    determining memory utilization of the multi-core chip;
    in response to the memory utilization of the multi-core chip exceeding a first level and a historical prefetching accuracy not exceeding a second level, modifying data prefetching for the multi-core chip from a first data prefetching arrangement to a second data prefetching arrangement to reduce unused prefetched cache lines; and
    in response to the memory utilization of the multi-core chip not exceeding the first level, maintaining the first data prefetching arrangement, wherein the first and second data prefetching arrangements are different, and wherein in response to the memory utilization being below the first level a prefetcher refrains from delaying implementation of a prefetch ramp and in response to the memory utilization being above the first level and the historical prefetching accuracy being below the second level the prefetcher delays implementation of the prefetch ramp until one or more cache lines of a candidate stream are confirmed.

2. The method of claim 1, further comprising:
    determining the historical prefetching accuracy.

3. The method of claim 1, wherein in response to the historical prefetching accuracy being above the second level the prefetcher refrains from delaying implementation of the prefetch ramp.

4. A processor, comprising:

a memory; and multiple processor cores coupled to the memory, wherein the processor is configured to:

determine memory utilization of the processor;

in response to the memory utilization of the processor exceeding a first level and a historical prefetching accuracy not exceeding a second level, modify data prefetching for the processor from a first data prefetching arrangement to a second data prefetching arrangement to reduce unused prefetched cache lines; and in response to the memory utilization of the multi-core chip not exceeding the first level, maintain the first data prefetching arrangement, wherein the first and second data prefetching arrangements are different, and wherein in response to the memory utilization being below the first level a prefetcher refrains from delaying implementation of a prefetch ramp and in response to the memory utilization being above the first level and the historical prefetching accuracy being below the second level the prefetcher delays implementation of the prefetch ramp until one or more cache lines of a candidate stream are confirmed.

5. The processor of claim 4, wherein the processor is further configured to:

determine the historical prefetching accuracy.

6. The processor of claim 4, wherein in response to the historical prefetching accuracy being above the second level the prefetcher refrains from delaying implementation of the prefetch ramp.

7. A data processing system, comprising:

a data storage subsystem; and a processor coupled to the data storage subsystem, wherein the processor is configured to:

determine memory utilization of the processor;

in response to the memory utilization of the processor exceeding a first level and a historical prefetching accuracy not exceeding a second level, modify data prefetching for the processor from a first data prefetching arrangement to a second data prefetching arrangement to minimize unused prefetched cache lines;

in response to the memory utilization of the multi-core chip not exceeding the first level, maintain the first data prefetching arrangement, wherein the first and second data prefetching arrangements are different;

in response to the memory utilization being below the first level, refrain from delaying implementation of a prefetch ramp; and in response to the memory utilization being above the first level and the historical prefetching accuracy being below the second level, delay implementation of the prefetch ramp until one or more cache lines of a candidate stream are confirmed.

8. The data processing system of claim 7, wherein the processor is further configured to:

determine the historical prefetching accuracy.

9. The data processing system of claim 7, wherein the processor is further configured to;

in response to the historical prefetching accuracy being above the second level, refrain from delaying implementation of the prefetch ramp.

\* \* \* \* \*